(12) United States Patent
Fujita et al.

(10) Patent No.: US 6,181,473 B1
(45) Date of Patent: Jan. 30, 2001

(54) IMAGE DEVICE FOR FORMING AN ERECTED IMAGE

(75) Inventors: Kazuhiro Fujita, Machida; Ikuo Maeda, Sagamihara; Hiroyuki Inoue, Tokyo-to, all of (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/219,885

(22) Filed: Dec. 24, 1998

(30) Foreign Application Priority Data

Dec. 24, 1997 (JP) .................................................... 9-366443

(51) Int. Cl.$^7$ ................................................. G02B 27/10
(52) U.S. Cl. ........................ 359/621; 359/619; 359/623; 359/627
(58) Field of Search .................................... 359/619, 621, 359/625, 627, 628, 626, 726, 622, 623

(56) References Cited

U.S. PATENT DOCUMENTS

| | | | |
|---|---|---|---|
| 3,836,249 | * | 9/1974 | Weber ..................................... 355/51 |
| 4,505,570 | * | 3/1985 | Inokuchi ............................... 355/3 R |
| 5,150,259 | * | 9/1992 | Oishi .................................... 359/619 |

FOREIGN PATENT DOCUMENTS 4-130411  5/1992 (JP) .

* cited by examiner

Primary Examiner—Georgia Epps
Assistant Examiner—David N. Spector
(74) Attorney, Agent, or Firm—Oblon, Spivak, McClelland, Maier & Neustadt, P.C.

(57) ABSTRACT

A plurality of first cylindrical lenses aligned in an array, having a collecting function with respect to an alignment direction parallel to the array, to collect luminous flux from a body to be imaged. A first reflective collector-surface having a reflective collecting function with respect to a perpendicular direction perpendicular to the alignment direction collects the luminous flux from the plurality of first cylindrical lenses, and provides a collected parallel luminous flux to a plurality of roof-mirror type reflective plane-pairs or to a plurality of right-angle prisms. The plurality of roof-mirror type reflective plane-pairs or right-angle prisms reflects the luminous flux toward a second reflective collector-surface disposed for convergence of the luminous flux with respect to the perpendicular direction. The second reflective collector-surface reflects the luminous flux toward a plurality of second cylindrical lenses disposed for convergence of the luminous flux with respect to the alignment direction. Further, the luminous flux from the plurality of second cylindrical lenses converges to form an image.

17 Claims, 7 Drawing Sheets

US 6,181,473 B1

IMAGE DEVICE FOR FORMING AN ERECTED IMAGE

BACKGROUND OF THE INVENTION

1. Field of the Invention

The present invention relates to an imaging device for use in an optical reading system used in an image forming apparatus or an image reading apparatus such as a copying machine, a facsimile machine, etc. In particular, the present invention relates to an imaging device, for forming an erected image, incorporated in a reading scanner which may be combined with a charge coupled device line sensor with single-magnification, an optical printer head, a self-scanned optical printer head, or other devices.

2. Discussion of the Background

A background imaging device for an optical reading system incorporated in a copying machine, a facsimile machine, or another similar machine is known. For example, an imaging device having a plurality of micro reflective planes aligned in an array is disclosed in Japanese Laid-Open Patent Publication No. 4-130411/1992. The plurality of micro reflective planes have a converging function with respect to a direction parallel to an alignment direction. An angle between the planes is a right angle. Alternatively, when the plane angle at a valley portion of the plurality of reflective planes is a little less than the right angle, the converging function is improved.

The imaging device disclosed in the above-mentioned Patent Application '411 has a cylindrical lens and at least one cylindrical mirror having a generating line parallel to an alignment direction in which reflective planes are aligned periodically, and the generating line of the cylindrical mirror is a straight line included in the converging surface of the cylindrical mirror. In addition, the imaging device is formed to have a generating line of the cylindrical lens parallel to that of the cylindrical mirror. Another imaging device having two cylindrical mirrors for an incident light and an emitted light is also disclosed in the Patent Application '411, and the two cylindrical lenses for the cylindrical mirrors are formed to have respective parallel generating lines relative to the two cylindrical mirrors.

When the above-mentioned imaging device has a plane angle between the reflective planes at a right angle, luminous flux does not converge by the plurality of reflective planes with respect to a perpendicular direction that is perpendicular to the alignment direction, while the luminous flux converges by the cylindrical mirror to form an image. When the imaging device has two cylindrical mirrors for incident light and emitted light, the luminous flux is collected by the first cylindrical mirror with respect to the perpendicular direction. Then, the collected luminous flux is reflected by the reflective planes, and is converged by the next cylindrical mirror to form an image. That is, with respect to the perpendicular direction, the first cylindrical mirror collects the incident luminous flux, and the second cylindrical mirror is subsequently used for the convergence of the collected luminous flux to form an image. On the other hand, as to the luminous flux with respect to a direction parallel with the alignment direction, the luminous flux is imaged by a converging function of the plurality of reflective planes for a diffused luminous flux. That is, light emitted from a point returns approximately to the same point, because the reflected light becomes approximately parallel to the emitted light.

A direction in which the luminous flux converges by the cylindrical mirror is defined as a longitudinal direction, and the direction parallel with the generating line of the cylindrical mirror is defined as a transversal direction that is perpendicular to the longitudinal direction. When the angle between the reflective planes disclosed in the Patent Application '411 is a right angle, the luminous flux to be imaged in the longitudinal direction converges by the cylindrical mirror to form an image. Further, the luminous flux in the transverse direction is converged to form an image by the intrinsic converging function of the plurality of reflective plane pairs.

When the plane angle between the reflective plane pairs at the valley portion is slightly less than 90 degrees, the above-mentioned converging function in the transverse direction is improved so that the reflected light originally emitted from one point returns closer to the original point. Resolution with respect to the transverse direction of the imaging device having the plane angle of 90 degrees is limited by the pitch of the plurality of reflective planes in the alignment direction according to the Patent Application '411. This results because the transverse luminous flux parallel to the generating line of the cylindrical mirrors is converged by the reflective plane pairs. The function of the reflective plane pairs in this case is described such that the diffused transverse light is projected onto the plurality of reflective planes, and the reflected transverse light is parallel to the incident light.

In order to achieve an imaging device for a facsimile machine having, for example, a resolution of the order of 200 dpi (dot per inch) as disclosed in the Patent Application '411, the formation of the plurality of reflective planes is required with a resolution several times higher than that for picture elements. The formation at this resolution may be very difficult.

In addition, since there are edges and valleys at the joining portions of the reflective planes in the plurality of reflective plane pairs, diffuse reflection or light scattering by them is unavoidable. In a practical sense, it is impossible to form an edge with an infinitesimal line width for reducing the effect of the edge, and the edge actually formed has a certain degree of line width. Therefore, an increment of the resolution accompanied by a reduction of the pitch of the plurality of reflective planes increases the fraction of the scattered light by the edge, and the scattered light in a form of flare light affects the image properties, which may deteriorate a contrast of the image.

Furthermore, when the angle between the reflective planes is slightly less than the right angle, although the converging function is improved, reduction of the pitch of the above-mentioned plurality of reflective planes may not be achieved. Therefore, the adoption of a plane angle of slightly less than the right angle may not be effective for reducing the flare light by the diffuse reflection by the edges.

Therefore, the background imaging device still suffers from the above-mentioned problems such as stray light or flare light that may decrease the contrast.

SUMMARY OF THE INVENTION

Accordingly, the present invention has been made in view of the above-discussed and other problems, and an object of the present invention is to address and resolve the above-discussed and other problems.

According to one embodiment of the present invention, a novel imaging device for forming an image is provided, which includes a plurality of first collectors and a plurality of second collectors. A reflective unit is disposed between the plurality of first collectors and the plurality of second collectors, and has a first reflective collector-surface and a second reflective collector-surface. A plurality of roof-mirror type reflective plane-pairs are further provided.

The plurality of first collectors are aligned in an array, and are disposed for receiving an incident luminous flux from a body to be imaged. Each of the plurality of first collectors has a collecting function with respect to a direction parallel to the array, which provides a collected luminous with respect to the direction.

The plurality of second collectors are aligned in another array parallel to the direction with a same pitch as the plurality of first collectors, and each of the plurality of second collectors has a converging function for forming an image with respect to the direction. The plurality of second collectors is disposed spaced-apart opposing the plurality of first collectors.

The first reflective collector-surface has a reflective collecting function with respect to a perpendicular direction that is perpendicular to the direction for the luminous flux from the plurality of first collectors, which provides a collected luminous flux with respect to the perpendicular direction. Further, the first reflective collector-surface is directed obliquely to an optical axis of the plurality of first collectors to reflect the luminous flux from the plurality of first collectors toward the plurality of roof-mirror type reflective plane-pairs.

The second reflective collector-surface disposed between the first reflective collector-surface and the plurality of second collectors has a reflective converging function for forming an image with respect to the perpendicular direction, and is directed obliquely to an optical axis of the plurality of second collectors to reflect the luminous flux from the plurality of roof-mirror type reflective plane-pairs toward the plurality of second collectors.

A plane angle between planes included in each of the plurality of roof-mirror type reflective plane-pairs is 90 degrees. The plurality of roof-mirror type reflective plane-pairs has a structure such that the reflective plane-pairs are aligned periodically with a same pitch and with a parallel direction as the plurality of first collectors. The plurality of roof-mirror type reflective plane-pairs is disposed to reflect the luminous flux from the first reflective collector-surface to the second reflective collector-surface.

Accordingly, the first reflective collector-surface collects a luminous flux from a point of an object to be imaged in partnership with the plurality of first collectors and provides the collected parallel luminous flux to the plurality of roof-mirror type reflective plane-pairs. Further, the plurality of roof-mirror type reflective plane-pairs reflects the collected parallel luminous flux toward the second reflective collector-surface which condenses the collected luminous flux to converge in partnership with the plurality of second collectors.

In this novel imaging device, the luminous flux reflected by the plurality of roof-mirror type reflective plane-pairs is a parallel luminous flux, not only with respect to the direction parallel with the alignment direction but also with respect to the perpendicular direction. Therefore, an erected image with single-magnification is formed on an imaging field with less stray light to reduce stray light deteriorating the contrast of the image.

According to another embodiment of the present invention, another novel imaging device is provided, which includes a first collector that is elongated in a direction, a second collector that is elongated in a parallel direction, a reflective unit disposed between the first collector and the second collector, a plurality of first reflective collector-surfaces aligned in an array parallel to the direction, a plurality of second reflective collector-surfaces aligned in another array parallel to the direction, and a plurality of roof-mirror type reflective plane-pairs.

In this novel imaging device, the plurality of second reflective collector-surfaces collects a luminous flux from a point of an object to be imaged in partnership with the first collector and provides the collected parallel luminous flux to the plurality of roof-mirror type reflective plane pairs. Further, the plurality of roof-mirror type reflective plane pairs reflects the collected parallel luminous flux toward the plurality of second reflective collector-surfaces that condenses the collected luminous flux to converge in partnership with the second collector.

According to another embodiment of the present invention, another novel imaging device is provided, in which the plurality of roof-mirror type reflective plane-pairs of above-described imaging devices is replaced by a plurality of right-angle prisms. The plurality of right-angle prisms is formed so that the angle of reflection in each right-angle prism exceeds a critical angle of total internal reflection. Therefore, the plurality of right-angle prisms has the capability for total internal reflection, which does not require any formation of reflective films. This is an additional advantage.

According to yet another embodiment of the present invention, another novel imaging device is provided, which is composed of an integrated body having a plurality of first collector-surfaces, a plurality of second collector-surfaces, a first reflective collector-surface, a second reflective collector-surface, and a plurality of right-angle prisms. In this novel imaging device, because the integrated body enables the utilization of the above-mentioned total internal reflection, there are no requirements of forming reflective films on the right-angle prisms, or on the reflective collector-surfaces.

Alternatively, another novel imaging device that is composed of an integrated body having a first collector-surface, a second collector-surface, a plurality of first reflective collector-surfaces, a plurality of second reflective collector-surfaces, and a plurality of right-angle prisms may be provided.

According to another embodiment of the present invention, another novel imaging device is further provided, which includes a reflective unit, a plurality of first reflective collector-surfaces disposed on the reflective unit, a plurality of second reflective collector-surfaces disposed on the reflective unit, and a plurality of roof-mirror type reflective plane-pairs. In this novel device, as the convergence is performed only by the reflective surfaces, there are no chromatic aberrations in this imaging device.

Alternatively, another novel imaging device including a reflective unit, a plurality of first reflective collector-surfaces disposed on the reflective unit, a plurality of second reflective collector-surfaces disposed on the reflective unit, and a plurality of right-angle prisms may be provided.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
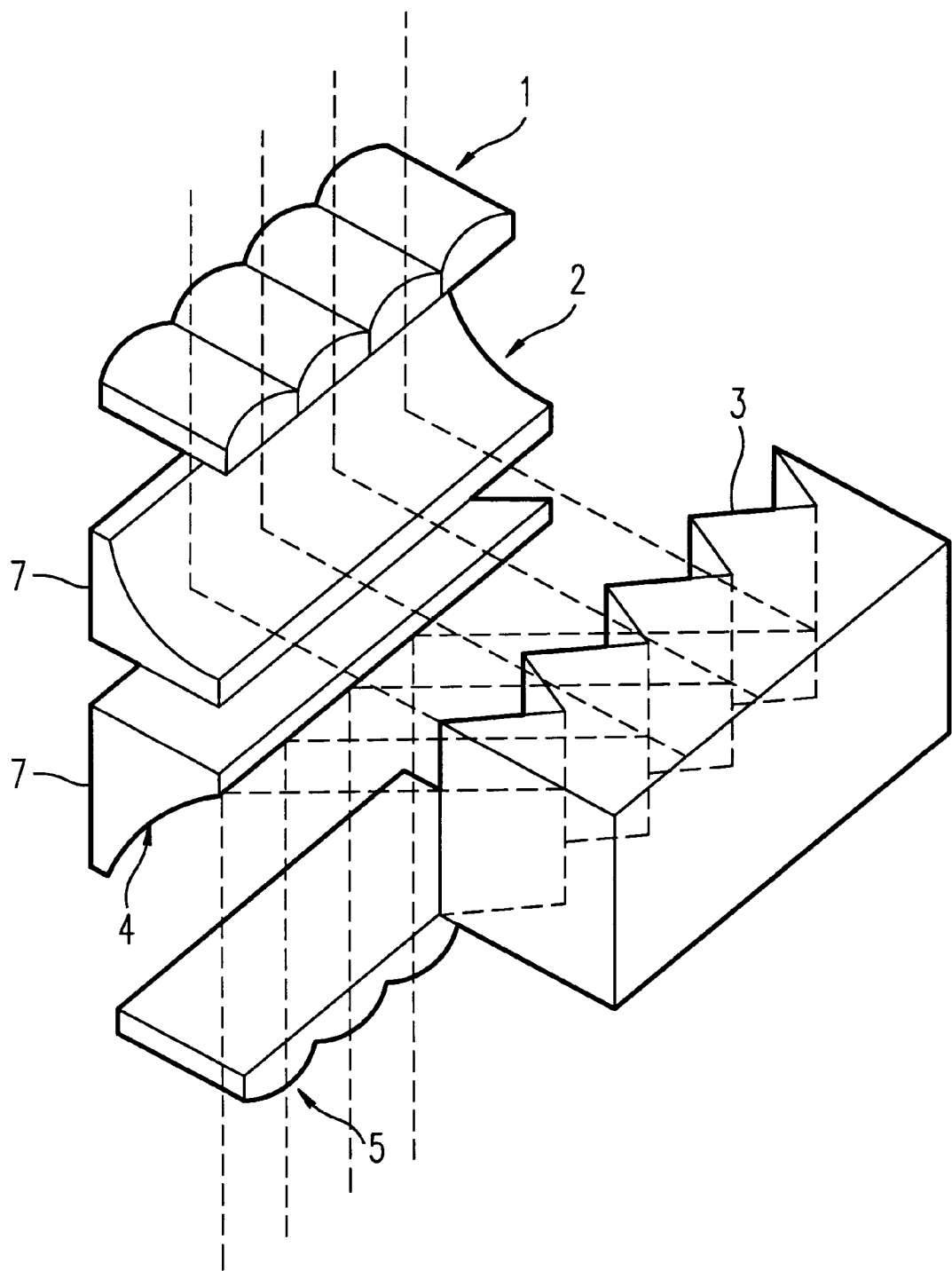
FIG. 1 is a schematic view showing an imaging device according to a first embodiment of the present invention.

Referring now to the drawings, in which like reference numerals designate identical or corresponding parts throughout the several views, and more particularly referring to FIG. 1 thereof, an imaging device according to one embodiment of the present invention is shown.

The imaging device of FIG. 1 includes a plurality of first cylindrical lenses 1, a plurality of second cylindrical lenses 5, reflective units 7 respectively having a first reflective collector-surface 2 and a second reflective collector-surface 4, and a plurality of roof-mirror type reflective plane-pairs 3.

The plurality of first cylindrical lenses 1 are used as a plurality of first collectors, and are aligned crosswise in an array. The plurality of second cylindrical lenses 5 are used as a plurality of second collectors, and are aligned in another array with a parallel direction and with the same pitch as the plurality of first cylindrical lenses 1. Each of the plurality of first cylindrical lenses 1 has a collecting function for a luminous flux from a body to be imaged with respect to a direction that is parallel to an alignment direction. Each of the plurality of first cylindrical lenses 1 provides a collected luminous flux. Each of the plurality of second cylindrical lenses 5 has a converging function for forming an image also with respect to the alignment direction. Optical properties of the plurality of second cylindrical lenses 5 may be equivalent to those of the plurality of first cylindrical lenses 1.

The first reflective collector-surface 2 has a collecting function with respect to a perpendicular direction that is perpendicular to the alignment direction, and provides a collected luminous flux. The reflective collector-surface 4 has a converging function for forming an image with respect to the perpendicular direction. Optical properties of the second reflective collector-surface 4 may be equivalent to those of the first reflective collector-surface 2, although the surface directions thereof are different from each other. According to one embodiment, the first reflective collector-surface 2 and the second reflective collector-surface 4 may each be a cylindrical reflective surface, for example.

The plurality of roof-mirror type reflective plane-pairs 3 is constructed so that a plurality of roof-mirror type reflective plane-pairs each having a plane angle at a right angle is aligned parallel to the alignment direction with the same pitch as the plurality of first cylindrical lenses 1.

The plurality of first cylindrical lenses 1 is disposed so that convex surfaces thereof are directed toward an outside and are facing an incident luminous flux. Further, the first reflective collector-surface 2 is disposed so that the luminous flux from the plurality of first cylindrical lenses 1 is reflected toward the plurality of roof-mirror type reflective plane-pairs 3. The plurality of roof-mirror type reflective plane-pairs 3 may be disposed as follows.

(1) An alignment direction of the plurality of the roof-mirror type reflective plane-pairs 3 is parallel to that of the plurality of first cylindrical lenses 1.

(2) A pitch of the plurality of roof-mirror type reflective plane-pairs 3 is the same as a pitch of the plurality of first cylindrical lenses 1.

(3) An optical axis of the plurality of first cylindrical lenses 1 is approximately parallel with the valley line of each roof-mirror type reflective plane-pair 3, where the valley line is a line included by both planes of the roof-mirror type reflective plane-pair 3.

The second reflective collector-surface 4 is disposed in a symmetrical position of the first reflective collector-surface 2 with respect to a reference plane (not shown) that is perpendicular to the valley lines of the plurality of roof-mirror type reflective plane-pairs 3. The plurality of second cylindrical lenses 5 is disposed in a symmetrical position of the plurality of first cylindrical lenses 1 with respect to the reference plane. Namely, the second reflective collector-surface 4 is disposed to reflect the luminous flux from the plurality of roof-mirror type reflective plane-pairs 3 to the plurality of second cylindrical lenses 5. Moreover, the plurality of second cylindrical lenses 5 is disposed so that convex surfaces thereof are directed toward an outside.

These parts of the imaging device may be manufactured, for example, by a known method for fabricating an integrated body. Polycarbonate (PC) resin, or a low chromatic aberration material such as polymethyl methacrylate (PMMA) resin or amorphous polyolefin resin for the purpose of reducing chromatic aberration may be used as the material for the plurality of cylindrical lenses 1 and/or 5. A reflective film such as a silver film or an aluminum film may be deposited on the first reflective collector-surface 2, on the second reflective collector-surface 4, or on the plurality of roof-mirror type reflective plane-pairs 3 using a known vacuum evaporation method, for example. Alternatively, a processed bulk metal body having a mirror surface may be used for the reflective elements.

Figure 2A:
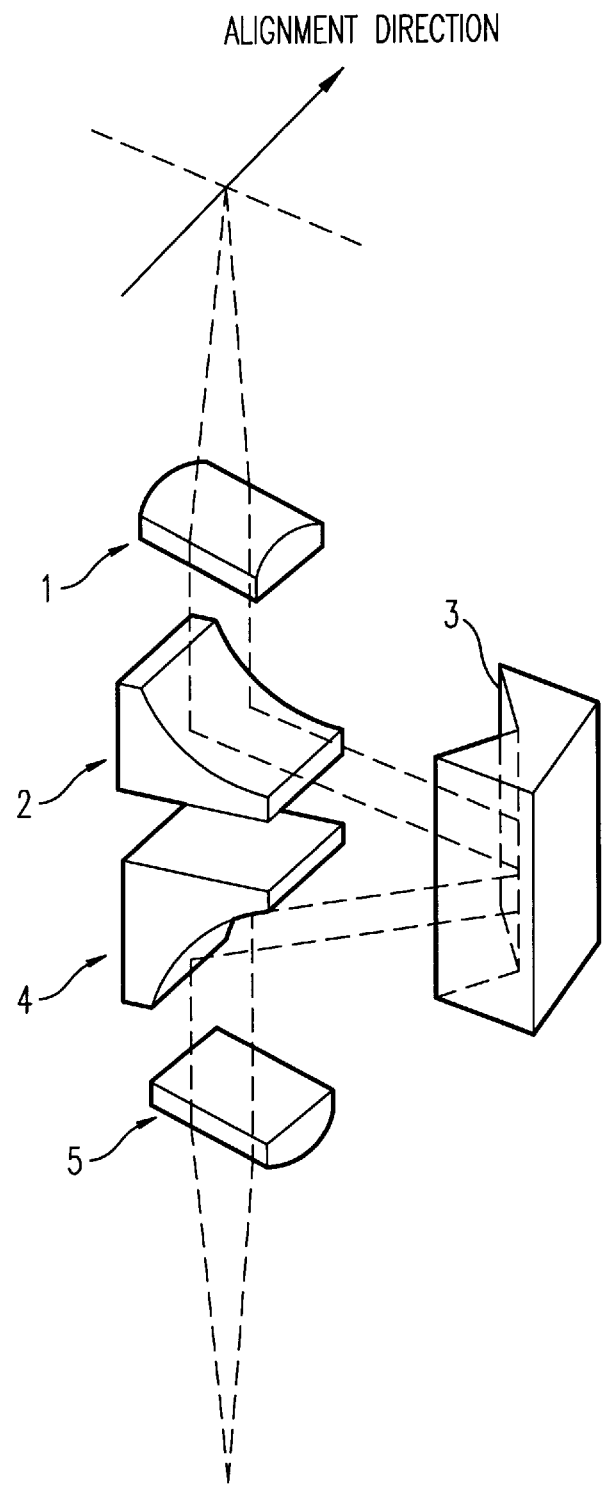
FIGS. 2A and 2B are schematic views respectively showing the imaging process of the imaging device shown in FIG. 1.
Figure 2B:
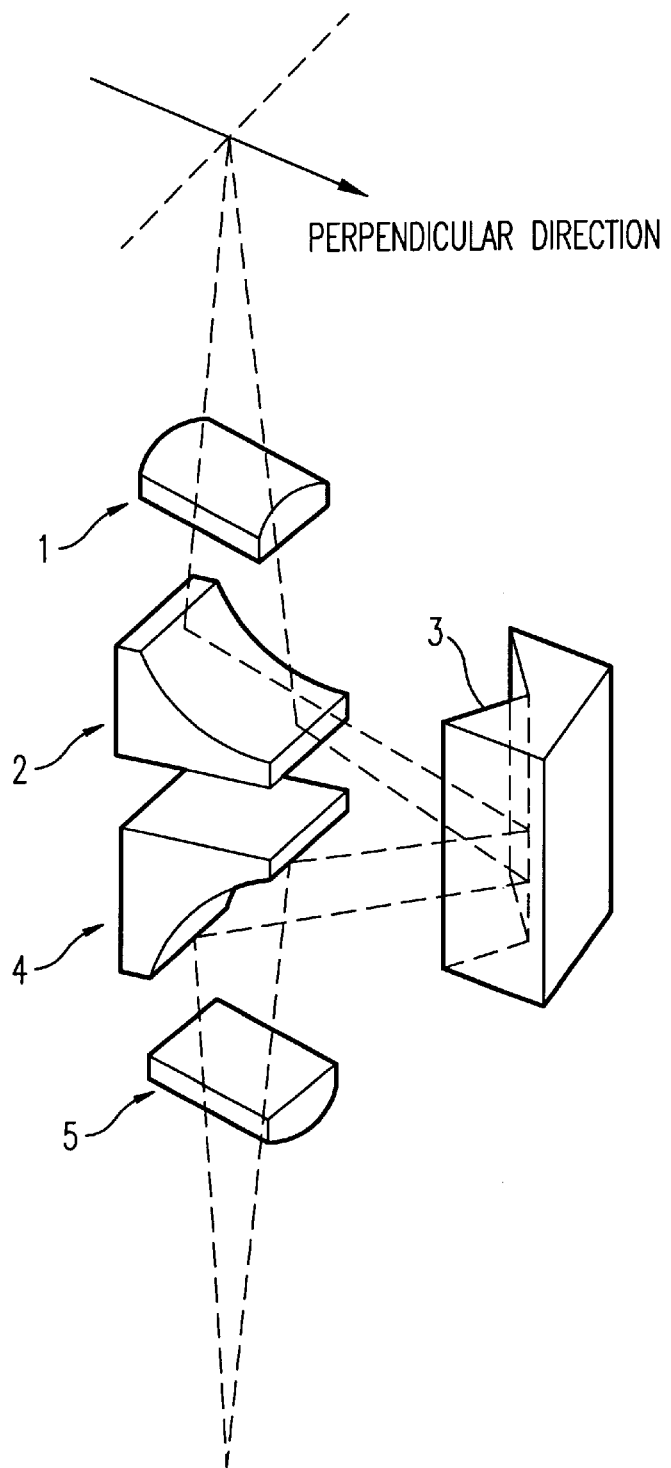

FIGS. 2A and 2B respectively show, for the alignment and perpendicular directions, the imaging principle of the imaging device of FIG. 1. For simplicity of explanation, the necessary portions that correspond to only one unit from each of the plurality of cylindrical lenses 1, 5 and the plurality of roof-mirror type reflective plane-pairs 3 is extracted and shown in FIGS. 2A and 2B.

FIG. 2A shows the imaging process of a diffused luminous flux emitted from a point of an object with respect to a direction parallel to the alignment direction. The first cylindrical lens 1 collects a luminous flux that is diffused from the point with respect to the alignment direction, and provides a parallel luminous flux with respect to the alignment direction. Next, the first reflective collector-surface 2 reflects the collected luminous flux toward the roof-mirror type reflective plane-pair 3.

The roof-mirror type reflective plane-pair 3 reflects the luminous flux two times, and provides the luminous flux to the second reflective collector-surface 4. The second reflective collector-surface 4 reflects the luminous flux from the roof-mirror type reflective plane-pair 3 toward the second cylindrical lens 5. Finally, the second cylindrical lens 5 condenses the collected luminous flux with respect to the alignment direction, and thereby forms an image.

FIG. 2B shows the imaging process of a luminous flux that is diffused from a point of an object with respect to a direction perpendicular to the alignment direction. The luminous flux diffused from the point with respect to the perpendicular direction passes through the first cylindrical lens 1, and is reflected by the first reflective collector-surface 2 toward the roof-mirror type reflective plane-pair 3. With respect to the perpendicular direction, the luminous flux is collected by this reflection, and a parallel luminous flux is provided. The roof-mirror type reflective plane-pair 3 reflects the luminous flux two times, and provides the luminous flux to the second reflective collector-surface 4, which condenses the collected reflected luminous flux with respect to the perpendicular direction. The converging luminous flux then passes through the second cylindrical lens 5.

As described above, the adoption of the structure illustrated in FIG. 1, in which the plurality of cylindrical lenses 1, 5 are aligned, enables the formation of an erected image with single-magnification. Further, the required width for the document reading is achieved by overlapping the images with respect to the alignment direction of roof-mirror type reflective plane-pairs 3.

As shown in FIGS. 2A and 2B, there is only one valley line within an effective region for the luminous flux corresponding to the above-described one unit. This result is achieved by the adoption of the structure in which the collected luminous flux is provided to the plurality of reflective plane-pairs 3 having the roof-mirror type structure. Therefore, a scattered luminous flux by the edge portion caused by a machining error, for example, can be suppressed considerably. For the purpose of restraining stray light, additional members (not shown) such as apertures with a preventive function to prevent cross talk in the alignment direction or isolation members may additionally be provided between the above-described optical components in order to shut down the luminous flux from neighboring cylindrical lenses. The apertures may be disposed, for example, as follows:

(1) in front of the plurality of first cylindrical lenses 1;

(2) between the plurality of first cylindrical lenses 1 and the first reflective collector-surface 2;

(3) between the first reflective collector-surface 2 and the plurality of roof-mirror type reflective plane-pairs 3;

(4) between the plurality of roof-mirror type reflective plane-pairs 3 and the second reflective collector-surface 4;

(5) between the second reflective collector-surface 4 and the plurality of second cylindrical lenses 5; and/or (6) past a rear side of the plurality of second cylindrical lenses 5.

Figure 3:
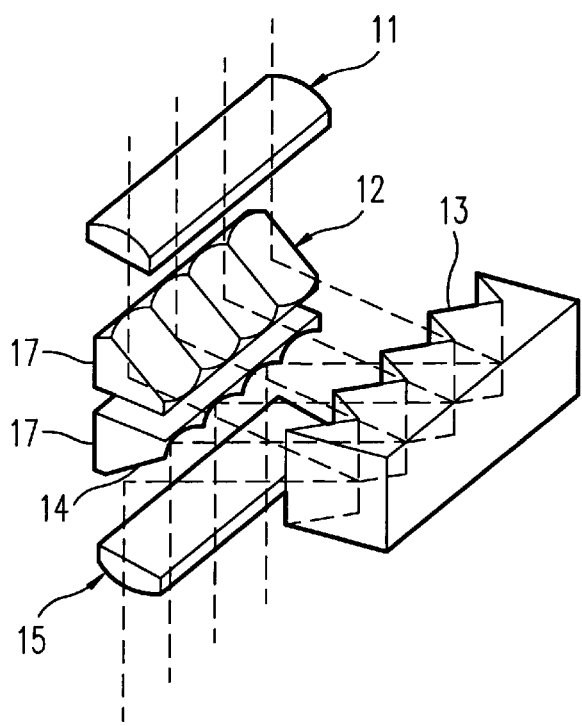
FIG. 3 is a schematic view showing another imaging device according to a second embodiment of the present invention.

FIG. 3 is a schematic view showing an imaging device according to a second embodiment of the present invention.

The imaging device of FIG. 3 includes a first cylindrical lens 11 elongated in a direction that is parallel to a generating line thereof, a second cylindrical lens 15 elongated in a direction that is parallel to a generating line thereof, reflective units 17, a plurality of first cylindrical reflective collector-surfaces 12, a plurality of second cylindrical reflective collector-surfaces 14, and a plurality of roof-mirror type reflective plane-pairs 13. The generating line is defined as a straight line running through the convex surface of the cylindrical lenses 11, 15.

The first cylindrical lens 11 is used as a first collector, and has a collecting function with respect to a perpendicular direction that is perpendicular to the generating line of the first cylindrical lens 11. A second cylindrical lens 15 is used as a second collector, and has a converging function with respect to the perpendicular direction. That is, the converging direction of the second cylindrical lens 15 is perpendicular to the alignment direction of the plurality of first cylindrical reflective collector-surfaces 12 shown in FIG. 3.

The reflective units 17 respectively include the plurality of first cylindrical reflective collector-surfaces 12 and the plurality of second cylindrical reflective collector-surfaces 14. The plurality of reflective surfaces are transversely aligned in a line. Each of the plurality of first cylindrical reflective collector-surfaces 12 has a collecting function with respect to a direction parallel to the alignment direction. Each of the plurality of second cylindrical reflective collector-surface 14 has a converging function with respect to the direction parallel to the alignment direction.

The plurality of roof-mirror type reflective plane-pairs 13 has a structure in which roof-mirror type reflective plane-pairs in a right angle relationship (roof-type mirror pair) are aligned with a parallel direction and with the same pitch as the plurality of first cylindrical reflective collector-surfaces 12.

The first cylindrical lens 11 is disposed towards an outside so that the convex surface thereof is facing incident luminous flux. Further, the plurality of first cylindrical reflective collector-surfaces 12 are disposed so that the cylindrical reflective surfaces reflect the luminous flux from the first cylindrical lens 11 toward the plurality of roof-mirror type reflective plane-pairs 13. The plurality of roof-mirror type reflective plane pairs 13 may have a structure as follows.

(1) An alignment direction of the roof-mirror type reflective plane pairs 13 is parallel to the alignment direction of the plurality of first cylindrical reflective collector-surfaces 12.

(2) A pitch of the alignment is the same as a pitch of the plurality of first cylindrical reflective collector-surfaces 12.

(3) An optical axis of the first cylindrical lens 11 is approximately parallel with valley lines of the plurality of roof-mirror type reflective plane-pairs 13.

The parts shown in FIG. 3 can be manufactured using a known method, for example an integrated body fabricating method. As to the base material for the first cylindrical lens 11, for example, polycarbonate (PC) resin, or a low chromatic aberration material such as polymethyl methacrylate (PMMA) resin or amorphous polyolefin resin for the purpose of reducing chromatic aberration, is usable. A reflective film such as a silver film or an aluminum film may be deposited on the reflective planes of the plurality of cylindrical reflective collector-surfaces 12, 14 or on the plurality of roof-mirror type reflective plane-pairs 13.

The plurality of second cylindrical reflective collector-surfaces 14 is disposed in a symmetrical position to the plurality of first reflective collector-surfaces 12 with respect to a reference plane (not shown) perpendicular to the valley lines of the plurality of roof-mirror type reflective plane-pairs 13, and the second cylindrical lens 15 is disposed in a symmetrical position to the first cylindrical lens 11 with respect to the reference plane. That is, the plurality of second cylindrical reflective collector-surfaces 14 are disposed to reflect the luminous flux from the plurality of roof-mirror type reflective plane-pairs 13 toward the second cylindrical lens 15. The convex surface of the second cylindrical lens 15 is directed toward an outside.

As described above, the adoption of the structure illustrated in FIG. 3, in which the plurality of cylindrical reflective-surfaces is aligned, enables the formation of an erected image with single-magnification. Further, the required line width of the reading is achieved by overlapping the images with respect to the alignment direction of the plurality of roof-mirror type reflective plane-pairs 13.

As described above, in the second embodiment of FIG. 3, similar to the first embodiment, there is only one valley line portion in an effective region for the luminous flux corresponding to above-described one unit. This result is achieved by the adoption of the structure in which the collected luminous flux is provided to the plurality of reflective plane-pairs 13 having the roof-mirror type structure.

Therefore, in the embodiment of FIG. 3 the scattered luminous flux from the edge portion caused by a machining error, for example, can be suppressed considerably. For the purpose of restraining stray light, additional members (not shown) such as apertures with a preventive function to prevent cross talks in the alignment direction, or isolation members, may additionally be provided in order to shut down the luminous flux from the neighboring reflective converging lens similarly as discussed above.

Figure 4:
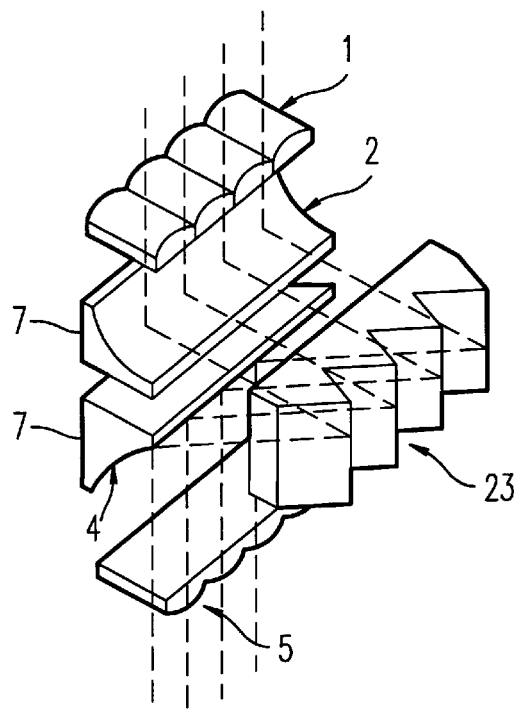
FIG. 4 is a schematic view showing another imaging device according to a third embodiment of the present invention.

FIG. 4 is a schematic view showing an imaging device according to a third embodiment of the present invention.

In FIG. 4, the plurality of roof-mirror type reflective plane-pairs 3 of FIG. 1 is replaced by a plurality of right-angle prisms 23. Further, the plurality of right-angle prisms 23 is disposed with a parallel direction and with the same pitch as the plurality of first cylindrical lenses 1. Each of the plurality of right-angle prisms 23 includes two planes having a plane angle of a right angle.

The imaging principle of the third embodiment of FIG. 4 is similar to that of the first embodiment, with the exception that the third embodiment achieves production of low-cost products with high efficiency by replacing the plurality of roof-mirror type reflective plane-pairs 3 with the plurality of right-angle prisms 23. This utilizes the characteristics that an incident luminous flux exceeding an angle of total internal reflection is reflected totally, and such that there are no requirements of forming reflective films on the reflective surfaces.

Figure 5:
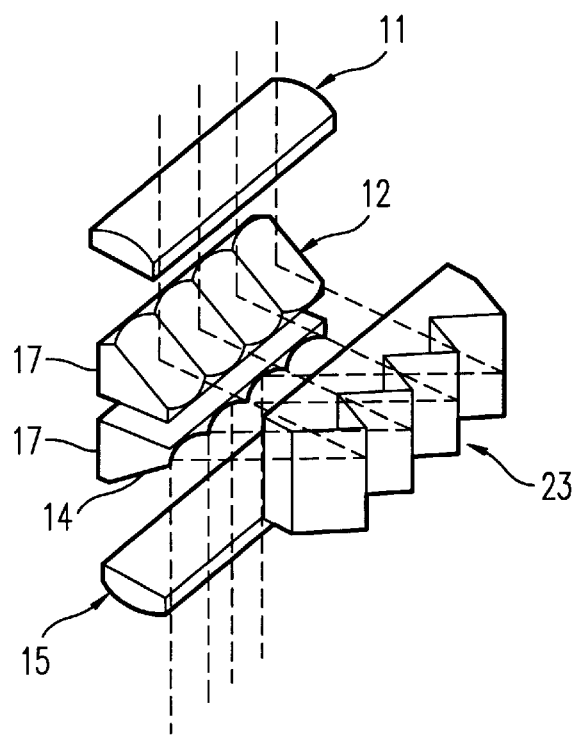
FIG. 5 is a schematic view showing another imaging device according to a fourth embodiment of the present invention.

FIG. 5 is a schematic view showing an imaging device according to a fourth embodiment of the present invention.

In FIG. 5, the plurality of roof-mirror type reflective plane-pairs 13 in FIG. 3 is replaced by a plurality of right-angle prisms 23. Further, the plurality of right-angle prisms 23 are aligned with a parallel direction and with the same pitch as the plurality of first reflective collector-surfaces 12, and each individual right angle prism includes a plane-pair with a plane angle of a right angle.

The imaging principle of the fourth embodiment of FIG. 5 is similar to that of the second embodiment, with the exception that the fourth embodiment achieves production of low-cost products with high efficiency by replacing the plurality of roof-mirror type reflective plane-pairs 13 with the plurality of right-angle prisms 23. This utilizes the characteristics that incident luminous flux exceeding an angle of total internal reflection is reflected totally, and further such that there are no requirements of forming reflective films on the reflective surfaces.

Figure 6:
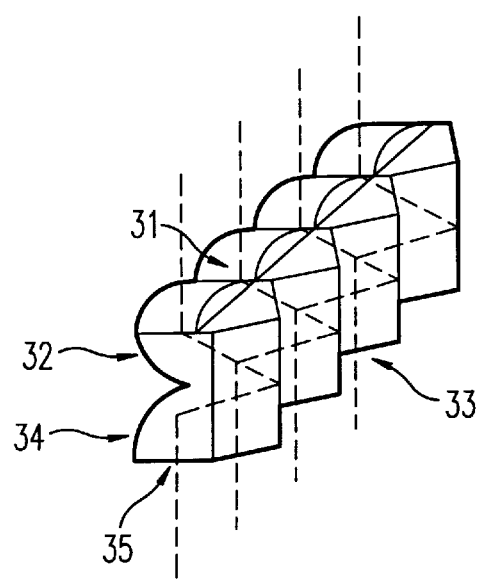
FIG. 6 is a schematic view showing another imaging device according to a fifth embodiment of the present invention.

FIG. 6 shows an imaging device according to a fifth embodiment of the present invention. In this embodiment of FIG. 6 all of the corresponding parts for the plurality of first cylindrical lenses 1, the plurality of second cylindrical lenses 5, the first reflective collector-surface 2, the second reflective collector-surface 4, and the plurality of right-angle prisms 23 in the third embodiment are included in one integrated body. In FIG. 6, a plurality of first collector-surfaces 31, a plurality of second collector-surfaces 35, a first reflective collector-surface 32, a second reflective collector-surfaces 34, and a plurality of right-angle prisms 33 are shown. The imaging device according to the fifth embodiment can be manufactured using an integrated body fabricating method such as, for example, an injection molding method or a compressive injection molding method.

The working principle of the fifth embodiment of FIG. 6 is similar to that of the first and the third embodiments, with the exception that the fifth embodiment achieves production of low-cost and mass-productive products with high efficiency by integrating the first reflective collector-surface 32 and the second reflective collector-surface 34. This utilizes the characteristics that an incident luminous flux exceeding an angle of total internal reflection is reflected totally, and further there are no requirements of a vacuum process for forming reflective films on the reflective surfaces.

Figure 7:
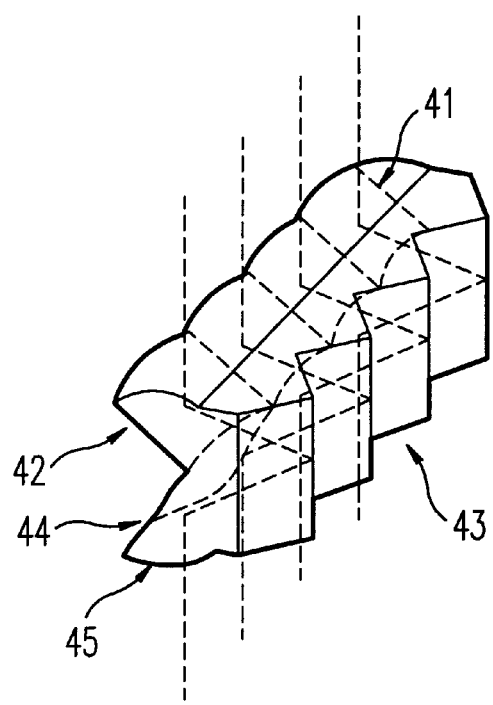
FIG. 7 is a schematic view showing another imaging device according to a sixth embodiment of the present invention.

FIG. 7 shows an imaging device according to a sixth embodiment of the present invention. In this embodiment of FIG. 7 all of the corresponding portions for the first cylindrical lens 11, the second cylindrical lens 15, the plurality of first cylindrical reflective collector-surfaces 12, the plurality of second cylindrical reflective collector-surfaces 14, and the plurality of right-angle prisms 23 in the fourth embodiment shown in FIG. 5 are included in one integrated body. In FIG. 7, a first cylindrical surface 41, a second cylindrical surface 45, a plurality of first cylindrical reflective collector-surfaces 42, a plurality of second cylindrical reflective collector-surfaces 44, and a plurality of right-angle prisms 43 are shown. The imaging device according to the sixth embodiment can be manufactured using a known integrated body fabricating method such as, for example, an injection molding method or a compressive injection molding method. The sixth embodiment basically works similar to the second and the fourth embodiments, with the exception that the sixth embodiment achieves production of low-cost and mass-productive products with high efficiency by integrating the plurality of first cylindrical reflective collector-surfaces 42 and the plurality of second cylindrical reflective collector-surfaces 44. This utilize the characteristics that an incident luminous flux exceeding an angle of total internal reflection is reflected totally, and further such that there are no requirements of a vacuum process for forming reflective films on the reflective surfaces.

Figure 8:
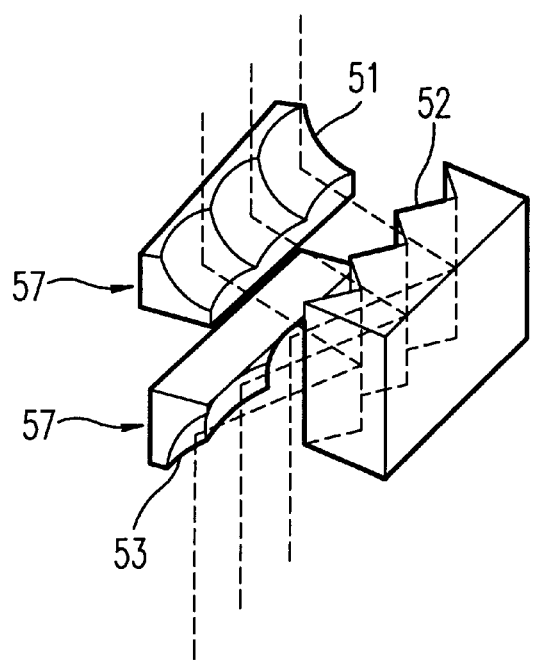
FIG. 8 is a schematic view showing another imaging device according to a seventh embodiment of the present invention.

FIG. 8 shows an imaging device according to a seventh embodiment of the present invention. In this embodiment of FIG. 8 a plurality of first reflective collector-surfaces 51 disposed on a reflective unit 57 have an isotropic collecting function for a luminous flux from a body to be imaged. Further, a plurality of second reflective collector-surfaces 53 disposed on the reflective unit 57 have an isotropic converging function for the collected luminous flux to form an image. A plurality of roof-mirror type reflective plane-pairs 52 are disposed to reflect the luminous flux from the plurality of first reflective collector-surfaces 51 toward the plurality of second reflective collector-surfaces 53. In the seventh embodiment of FIG. 8 using reflective collective-surfaces, a chromatic aberration free low-cost imaging device with reduced number of parts can be manufactured.

Figure 9:
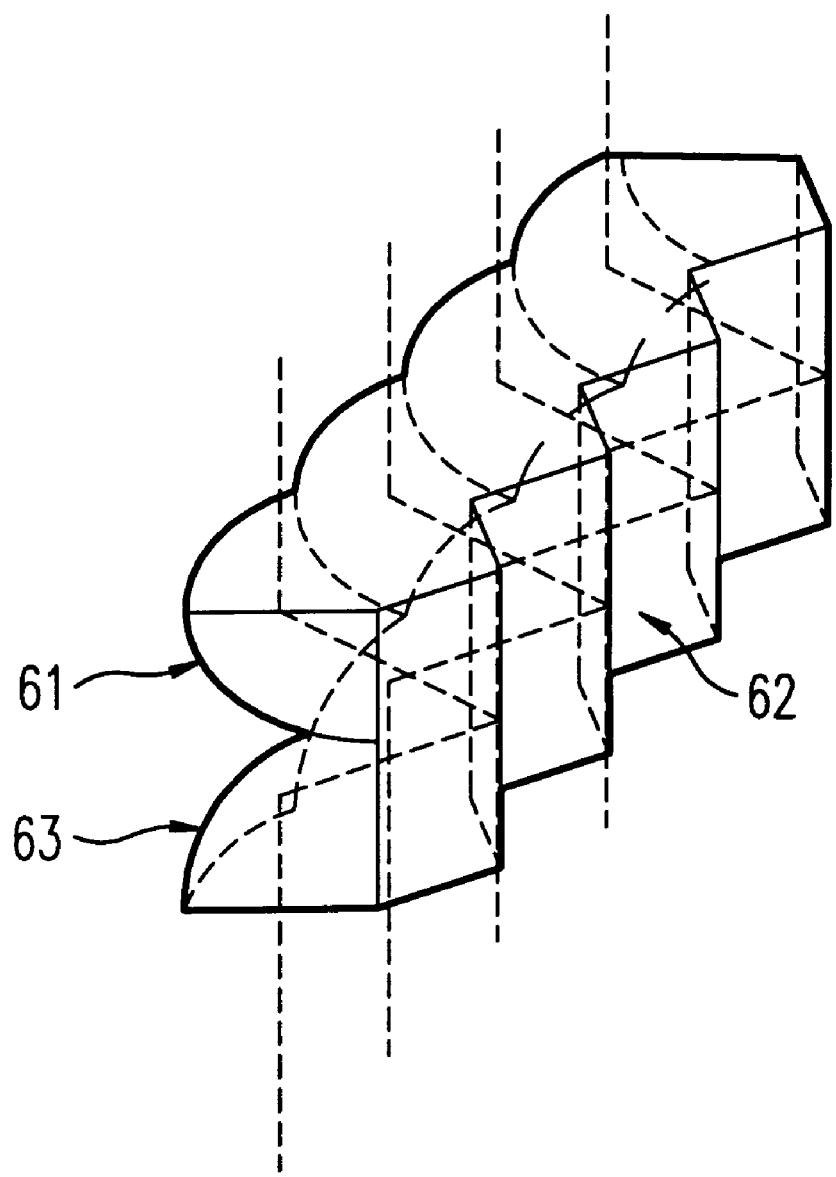
FIG. 9 is a schematic view showing another imaging device according to an eighth embodiment of the present invention.

FIG. 9 shows an imaging device according to an eighth embodiment of the present invention. In this embodiment of FIG. 9 the plurality of roof-mirror type reflective plane pairs 52 of FIG. 8 are replaced by a plurality of right-angle prisms 62. One integrated body includes a plurality of first reflective collector-surfaces 61, a plurality of second reflective collector-surfaces 63, and the plurality of right-angle prisms 62.

By comparing the eighth embodiment of FIG. 9 with the seventh embodiment shown in FIG. 8, the eighth embodiment has no requirements of forming reflective films using a vacuum process on the plurality of right-angle prisms as explained in the cases of the third and the fourth embodiments shown in FIGS. 4 and 5. Further, there are no requirements of forming reflective films on reflective surfaces 61 and 63, as explained in the cases of the fifth and the sixth embodiments in FIGS. 6 and 7. As a result, in the eighth embodiment of FIG. 9 an imaging device with high efficiency, with high mass-productivity, and with low-cost imaging device can be manufactured.

As described above in detail, the present invention provides novel imaging devices that reduce chromatic aberration and stray light such as flare light that may deteriorate contrast.

Obviously, numerous additional modifications and variations of the embodiments disclosed herein are possible in light of the above teachings. It is therefore to be understood that within the scope the appended claims, the present invention may be practiced otherwise than as specifically described herein.

The present document is based on Japanese priority document JP 09-366443, filed in the Japanese Patent Office on Dec. 24, 1997, the entire contents of which are incorporated herein by reference.

What is claimed is:

1. An imaging device for forming an image comprising:
   first collector means for collecting, with respect to a direction parallel to an alignment direction, luminous flux from a body to be imaged;
   second collector means for converging the luminous flux with respect to said alignment direction;
   first reflective means disposed between said first collector means and said second collector means, and including a first reflective surface and a second reflective surface for reflecting the luminous flux;
   second reflective means aligned parallel to said alignment direction for reflecting the luminous flux from said first reflective means;
   said first reflective surface having a reflective collecting function with respect to a perpendicular direction perpendicular to said alignment direction, directed obliquely to an optical axis of said first collector means to reflect the luminous flux from said first collector means toward said second reflective means;
   said second reflective means disposed to reflect the luminous flux toward said second reflective surface;
   said second reflective means comprising reflective plane pairs, each reflective plane pair having a plane angle of 90 degrees; and
   said second reflective surface having a reflective converging function with respect to said perpendicular direction, disposed between said second reflective means and said second collector means, and directed obliquely to an optical axis of said second collector means to reflect the luminous flux from said second reflective means toward said second collector means.

2. An image device according to claim 1, wherein the first and second collector means each comprise an array of collectors aligned in the alignment direction.

3. An imaging device according to claim 1, wherein the first and second collector means each comprise an elongated collector elongated in the alignment direction, the first reflective means comprises a plurality of first and second reflective surfaces.

4. An imaging device according to claim 1, wherein the first and second collector means each comprise an array of collectors aligned in the alignment direction.

5. An imaging device according to claim 4, wherein the first and second collector means each comprise an elongated collector elongated in the alignment director, the first reflective means comprises a plurality of first and second reflective surfaces.

6. An imaging device according to claim 4, wherein the first collector means, second collector means, first reflective means, and second reflective means are integrated as one unit.

7. An imaging device according to claim 5, wherein the first collector means, second collector means, first reflective means, and second reflective means are integrated as one unit.

8. An imaging device according to claim 1, wherein the first collector means and the first reflective means comprise a first plurality of first iosotropic collecting surfaces, and the second collector means and the first reflective means comprise a second plurality of second isotropic collecting surfaces.

9. An imaging device according to claim 8, wherein the first collector means and the first reflective means comprise a first plurality of first isotropic collecting surfaces, and the second collector means and the first reflective means comprise a second plurality of second isotropic collecting surfaces, and the first collector means, second collector means, first reflective means, and second reflective means are integrated as one unit.

10. An imaging device for forming an image comprising:
    a plurality of first collectors aligned in an alignment direction in a first array, and having a collecting function with respect to a direction parallel to an alignment direction of said array for luminous flux from a body to be imaged;
    a plurality of second collectors aligned in a second array parallel to said alignment direction and with a same pitch as said plurality of first collectors, having a converging function with respect to said alignment direction, and disposed spaced-apart opposing said plurality of first collectors;
    a reflective unit disposed between said plurality of first collectors and said plurality of second collectors, including a first reflective collector-surface and a second reflective collector-surface;
    a plurality of roof-mirror reflective plane-pairs each having a plane angle of 90 degrees, aligned parallel to said alignment direction with a same pitch as said plurality of first collectors;
    said first reflective collector-surface having a reflective collecting function with respect to a perpendicular direction that is perpendicular to said alignment direction, directed obliquely to an optical axis of said plurality of first collectors to reflect the luminous flux from said plurality of first collectors toward said plurality of roof-mirror reflective plane-pairs;
    said plurality of roof-mirror reflective plane-pairs disposed to reflect the luminous flux toward said second reflective collector-surface; and
    said second reflective collector-surface having a reflective converging function with respect to said perpendicular direction, disposed between said plurality of roof-mirror reflective plane-pairs and said plurality of second collectors, and directed obliquely to an optical axis of said plurality of second collectors so as to reflect the luminous flux from said plurality of roof-mirror reflective plane-pairs toward said plurality of second collectors.

11. An imaging device for forming an image comprising:

a first collector elongated in an alignment direction, and having a collecting function with respect to a perpendicular direction perpendicular to said alignment direction for luminous flux from a body to be imaged;

a second collector elongated in a parallel direction parallel to said alignment direction, having a converging function with respect to said perpendicular direction, and disposed spaced-apart opposing said first collector;

a reflective unit disposed between said first collector and said second collector, including a plurality of first reflective collector-surfaces aligned in a first array parallel to said alignment direction and a plurality of second reflective collector-surfaces aligned in a second array parallel to said alignment direction;

a plurality of roof-mirror reflective plane-pairs each having a plane angle of 90 degrees, aligned parallel to said alignment direction with a same pitch as said plurality of first reflective collector-surfaces;

said plurality of first reflective collector-surfaces having a reflective collecting function with respect to said alignment direction, directed obliquely to an optical axis of said first collector to reflect the luminous flux from said first collector toward said plurality of roof-mirror reflective plane-pairs;

said plurality of roof-mirror reflective plane-pairs disposed to reflect the luminous flux toward said plurality of second reflective collector-surfaces; and said plurality of second reflective collector-surfaces having a reflective converging function with respect to said alignment direction, disposed between said plurality of roof-mirror reflective plane-pairs and said second collector, and directed obliquely to an optical axis of said second collector to reflect the luminous flux from said plurality of roof-mirror reflective plane-pairs toward said second collector.

12. An imaging device for forming an image comprising:

a plurality of first collectors aligned in a first array in an alignment direction, and having a collecting function with respect to a direction parallel to the alignment direction of said array for luminous flux from a body to be imaged;

a plurality of second collectors aligned in a second array parallel to said alignment direction with a same pitch as said plurality of first collectors, having a converging function with respect to said alignment direction, and disposed spaced-apart opposing said plurality of first collectors;

a reflective unit disposed between said plurality of first collectors and said plurality of second collectors, including a first reflective collector-surface and a second reflective collector-surface;

a plurality of right-angle-prisms aligned parallel to said alignment direction with a same pitch as said plurality of first collectors;

said first reflective collector-surface having a reflective collecting function with respect to a perpendicular direction that is perpendicular to said alignment direction, directed obliquely to an optical axis of said plurality of first collectors to reflect the luminous flux from said plurality of first collectors toward said plurality of right-angle prisms;

said plurality of right-angle prisms disposed to reflect the luminous flux toward said second reflective collector-surface; and said second reflective collector-surface having a reflective converging function with respect to said perpendicular direction, disposed between said first plurality of right-angle prisms and said plurality of second collectors, and directed obliquely to an optical axis of said plurality of second collectors to reflect the luminous flux from said plurality of right-angle prisms toward said plurality of second collectors.

13. An imaging device for forming an image comprising:

a first collector elongated in an alignment direction, and having a collecting function with respect to a perpendicular direction perpendicular to said alignment direction for luminous flux from a body to be imaged;

a second collector elongated in a parallel direction parallel to said alignment direction, having a converging function with respect to said perpendicular direction, and disposed spaced-apart opposing said first collector;

a reflective unit disposed between said first collector and said second collector, including a plurality of first reflective collector-surfaces aligned in a first array parallel to said alignment direction and a plurality of second reflective collector-surfaces aligned in a second array parallel to said alignment direction;

a plurality of right-angle prisms aligned parallel to said alignment direction with a same pitch as said plurality of first reflective collector-surfaces;

said plurality of first reflective collector-surfaces having a reflective collecting function with respect to said alignment direction, directed obliquely to an optical axis of said first collector to reflect the luminous flux from said first collector toward said plurality of right-angle prisms;

said plurality of right-angle prisms disposed to reflect the luminous flux toward said plurality of second reflective collector-surfaces; and said plurality of second reflective collector-surfaces having a reflective converging function with respect to said alignment direction, disposed between said plurality of right-angle prisms and said second collector, directed obliquely to an optical axis of said second collector to reflect the luminous flux from said plurality of right-angle prisms toward said second collector.

14. An imaging device for forming an image comprising an integrated body including:

a plurality of first collector-surfaces aligned in a first array in an alignment direction, and having a collecting function with respect to a direction parallel to the alignment direction of said first array for luminous flux from a body to be imaged;

a plurality of second collector-surfaces aligned in a second array parallel to said alignment direction with a same pitch as said plurality of first collector-surfaces, having a converging function with respect to said alignment direction, and disposed spaced-apart opposing said plurality of first collector-surfaces;

a first reflective collector-surface having a reflective collecting function with respect to a perpendicular direction that is perpendicular to said alignment direction, and disposed between said first collector-surface and said second collector-surface;

a second reflective collector-surface having a reflective converging function with respect to said perpendicular direction, and disposed between said first reflective collector-surface and said plurality of second collector-surfaces;

a plurality of right-angle prisms aligned parallel to said alignment direction with a same pitch as said plurality of first collector-surfaces;

said first reflective collector-surface directed obliquely to an optical axis of said plurality of first collector-surfaces to reflect the luminous flux from said plurality of first collector-surfaces toward said plurality of right-angle prisms;

said plurality of right-angle prisms disposed to reflect the luminous flux toward said second reflective collector-surface; and said second reflective collector-surface directed obliquely to an optical axis of said plurality of second collector-surfaces to reflect the luminous flux from said plurality of right-angle prisms toward said plurality of second collector-surfaces.

15. An imaging device for forming an image comprising an integrated body including:

a first collector-surface elongated in an alignment direction, and having a collecting function with respect to a perpendicular direction perpendicular to said alignment direction for luminous flux from a body to be imaged;

a second collector-surface elongated in a parallel direction parallel to said alignment direction, having a converging function with respect to said perpendicular direction, and disposed spaced-apart opposing said first collector-surface;

a plurality of first reflective collector-surfaces aligned in a first array parallel to said alignment direction, having a reflective collecting function with respect to said alignment direction, and disposed between said first collector-surface and said second collector-surface, a plurality of second reflective collector-surfaces aligned in a second array parallel to said alignment direction, having a reflective converging function with respect to said alignment direction, and disposed between said plurality of first reflective collector-surfaces and said second collector-surface;

a plurality of right-angle prisms, aligned parallel to said alignment direction with a same pitch as said plurality of first reflective collector-surfaces;

said plurality of first reflective collector-surfaces, directed obliquely to an optical axis of said first collector-surface to reflect the luminous flux from said first collector-surface toward said plurality of right-angle prisms;

said plurality of right-angle prisms disposed to reflect the luminous flux toward said plurality of second reflective collector-surfaces; and said plurality of second reflective collector-surfaces, directed obliquely to an optical axis of said second collector-surface to reflect the luminous flux from said plurality of right-angle prisms toward said second collector-surface.

16. An imaging device for forming an image comprising:

a reflective unit;

a plurality of first reflective collector-surfaces aligned in a first array, having a collecting function that substantially reflects a luminous flux from a point of a body to be imaged into a parallel luminous flux, and disposed on said reflective unit;

a plurality of second reflective collector-surfaces aligned in a second array parallel to said first array, having a converging function that converges the luminous flux, and disposed on said reflective unit with a same pitch as said plurality of first reflective collector-surfaces; and a plurality of roof-mirror type reflective plane-pairs having a plane angle of 90 degrees, aligned parallel to said first array with a same pitch as said plurality of first reflective collector-surfaces, and reflecting the luminous flux from said plurality of first reflective collector-surfaces to said plurality of second reflective collector-surfaces.

17. An imaging device for forming an image comprising:

a reflective unit;

a plurality of first reflective collector-surfaces aligned in a first array, having a collecting function that substantially reflects a luminous flux from a point of a body to be imaged into a parallel luminous flux, and disposed on said reflective unit;

a plurality of second reflective collector-surfaces aligned in a second array parallel to said first array, having a converging function that converges the luminous flux, and disposed on said reflective unit with a same pitch as said plurality of first reflective collector-surfaces; and a plurality of right-angle prisms aligned parallel to said first array with a same pitch as said plurality of first reflective collector-surfaces, and reflecting the luminous flux from said plurality of first reflective collector-surfaces to said plurality of second reflective collector-surfaces.

* * * * *